(12) United States Patent
Wilkins

(10) Patent No.: US 12,179,480 B2
(45) Date of Patent: Dec. 31, 2024

(54) DETECTION OF PRINTHEAD CONDITIONS BASED ON ISOLATION SCORING

(71) Applicant: Ian Wilkins, Boulder, CO (US)

(72) Inventor: Ian Wilkins, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 113 days.

(21) Appl. No.: 17/812,520

(22) Filed: Jul. 14, 2022

(65) Prior Publication Data

US 2024/0017544 A1    Jan. 18, 2024

(51) Int. Cl.
| | |
|---|---|
| *B41J 2/045* | (2006.01) |
| *G06K 15/00* | (2006.01) |
| *G06K 15/02* | (2006.01) |
| *G06K 15/10* | (2006.01) |

(52) U.S. Cl.
CPC .......... *B41J 2/0451* (2013.01); *B41J 2/04586* (2013.01); *G06K 15/027* (2013.01); *G06K 15/102* (2013.01); *G06K 15/408* (2013.01)

(58) Field of Classification Search
CPC ............... B41J 2/0451; B41J 2/04586; B41J 2002/1657; B41J 2/16579; G06K 15/027; G06K 15/102; G06K 15/408
See application file for complete search history.

(56) References Cited

U.S. PATENT DOCUMENTS 6,164,749 A * 12/2000 Williams ............... B41J 2/2135
   347/19
6,561,613 B2   5/2003 Cunnagin et al.

| | | |
|---|---|---|
| 2020/0001617 A1 | 1/2020 | Kencana et al. |
| 2020/0238728 A1 | 7/2020 | Ebisawa |
| 2021/0118114 A1 | 4/2021 | Yosefi et al. |
| 2021/0167339 A1 | 6/2021 | Harjee et al. |
| 2021/0178752 A1 | 6/2021 | Johnson et al. |
| 2021/0183036 A1 | 6/2021 | Gurudath et al. |

FOREIGN PATENT DOCUMENTS

EP   2708363 A1   3/2014

OTHER PUBLICATIONS

European Search Report; Application EP23181697; Dec. 18, 2023.
Ming-Jong Tsai et al; A vision-based automatic alignment technology for color 3D additive manufacturing system with multiple print head.
Na Lin et al; Intelligent Adjustment of Printhead Driving Waveform Parameters for 3D Electronic Printing; MATEC Web of Conferences 100, 03034 (2017).
Wikipedia; Isolation forest; https://en.wikipedia.org/wiki/isolation_forest.

* cited by examiner

*Primary Examiner* — Thinh H Nguyen
(74) *Attorney, Agent, or Firm* — Duft & Bornsen, PC

(57) ABSTRACT

Systems and methods are provided for print quality management. One embodiment is a system for identifying print quality at a printer. The system includes a memory that stores reference data for nozzles of a printer, and a controller. The controller is configured to acquire measurement data after operation of the nozzles, calculate differences between the reference data and the measurement data, apply the differences as an input to an isolation forest, operate the isolation forest to determine isolation values for the nozzles, identify nozzles having more than a threshold amount of deviation from the reference data based on the isolation values, and generate a report flagging the identified nozzles for maintenance.

20 Claims, 8 Drawing Sheets

DETECTION OF PRINTHEAD CONDITIONS BASED ON ISOLATION SCORING

TECHNICAL FIELD

The following disclosure relates to the field of printing, and in particular, to ensuring printheads eject ink at a desired level of quality.

BACKGROUND

Entities with substantial printing demands typically use a production printer. A production printer is a high-speed printer used for volume printing, such as a continuous-forms printer that prints on a web of print media stored on a large roll. A production printer may include a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

Each printhead includes many nozzles, and each nozzle may be utilized to print a different portion of a physical page of a print job. However, it is not uncommon for nozzles to become clogged, to experience jet-outs, or to encounter other issues that degrade overall print quality (e.g., printhead conditions). When one or more nozzles of a printhead eject ink in a manner that degrades print quality, it may be desirable to initiate maintenance actions on the print head. However, some degradations in print quality are visually acceptable to print shop operators, and do not result in a need for immediate maintenance.

Thus, print shop operators continue to experience a need for detecting printheads that are providing below-optimal print quality, and for determining whether or not a printhead with below-optimal print quality is in need of maintenance.

SUMMARY

Embodiments described herein beneficially review print quality information for nozzles of a printhead, and then utilize an isolation forest to determine whether the degraded print quality has reached a point where maintenance should be performed on that printhead. By utilizing an isolation forest to identify nozzles that have a greatest amount of deviation from expected standards (e.g., a baseline level of performance, or the performance of other nozzles at the printer), the system is capable of rapidly detecting and reporting printheads with types of degraded print quality that are most likely to be noticeable. This beneficially enhances the ability of print shop operators to detect, and respond to, issues with print quality.

One embodiment is a system for identifying print quality at a printer. The system includes a memory that stores reference data for nozzles of a printer, and a controller. The controller is configured to acquire measurement data after operation of the nozzles, calculate differences between the reference data and the measurement data, apply the differences as an input to an isolation forest, operate the isolation forest to determine isolation values for the nozzles, identify nozzles having more than a threshold amount of deviation from the reference data based on the isolation values, and generate a report flagging the identified nozzles for maintenance.

A further embodiment is a non-transitory computer readable medium embodying programmed instructions which, when executed by a processor, are operable for performing a method of identifying print quality at a printer. The method includes storing reference data for nozzles of a printer, acquiring measurement data after operation of the nozzles, calculating differences between the reference data and the measurement data, applying the differences as an input to an isolation forest, operating the isolation forest to determine isolation values for the nozzles, identifying nozzles having more than a threshold amount of deviation from the reference data based on the isolation values, and generating a report flagging the identified nozzles for maintenance.

A further embodiment is a method for identifying print quality at a printer. The method includes storing reference data for nozzles of a printer, acquiring measurement data after operation of the nozzles, calculating differences between the reference data and the measurement data, applying the differences as an input to an isolation forest, operating the isolation forest to determine isolation values for the nozzles, identifying nozzles having more than a threshold amount of deviation from the reference data based on the isolation values, and generating a report flagging the identified nozzles for maintenance.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
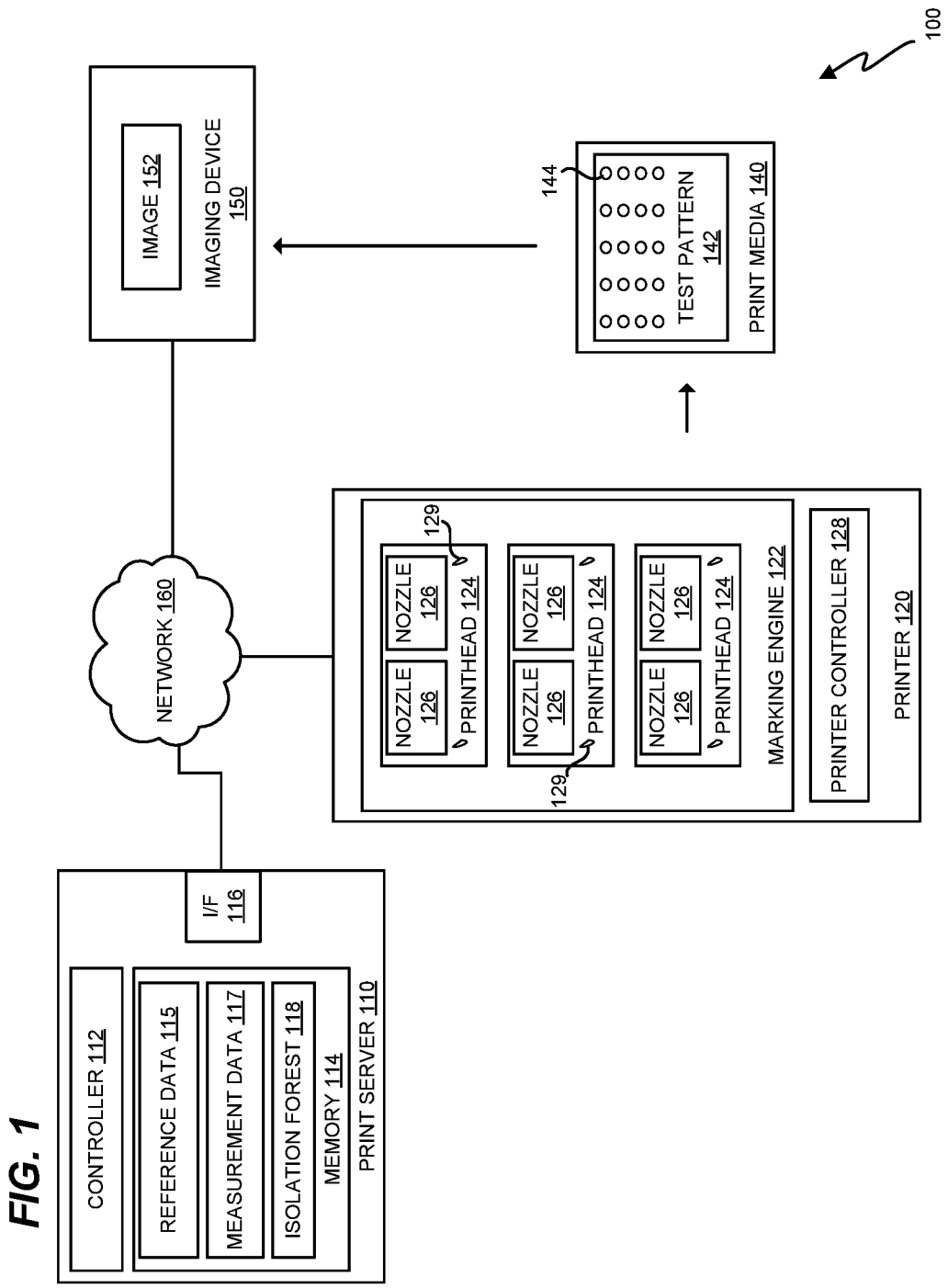
FIG. 1 is a block diagram of a print quality detection system in an illustrative embodiment.

FIG. 1 is a block diagram of a print quality detection system 100 in an illustrative embodiment. Print quality detection system 100 comprises any system, device, or component operable to review data for nozzles 126 of a printer 120. In this embodiment, print quality detection system 100 has been enhanced to utilize an isolation forest in order in to select printheads or nozzles for receiving maintenance (e.g., cleaning, repair, re-alignment, replacement, compensation, etc.). In this embodiment, print quality detection system 100 includes print server 110, which manages the operations of a printer 120 via a network 160. The printer 120 marks print media 140 with a test pattern 142, which is then imaged by an imaging device 150 for analysis. The print server 110 analyzes the image, and operates an isolation forest to identify nozzles 126 that are substantially deviated from their expected level of performance, and then flags corresponding printheads 124 for maintenance.

In this embodiment, print server 110 includes controller 112 and memory 114. Controller 112 directs the operations of the print server 110, for example by submitting print jobs, instructing printer 120 to print a test pattern 142, instructing imaging device 150 to acquire an image of the test pattern 142, and reviewing images taken by the imaging device 150 to determine print quality. Controller 112 may be implemented as custom circuitry, as a hardware processor executing programmed instructions, etc. Memory 114 may be implemented as Random Access Memory (RAM), a hard disk, a flash drive, and/or combinations thereof.

Memory 114 stores instructions for analyzing and interpreting images of test patterns 142 in order to determine print quality. In this embodiment, memory 114 includes isolation forest 118, reference data 115 defining a baseline level of performance (e.g., print quality) for the printer 120, and measurement data 117 defining the current level of print quality for the printer 120. In one embodiment, the reference data 115 and the measurement data 117 measure a same set of variables/characteristics. In another embodiment, the reference data may correspond to a printer different than printer 120 with a technical benefit of allowing comparisons to achieve consistency between different printers.

The reference data 115 and measurement data 117 may comprise droplet data. As used herein, "droplet data" comprises data that quantifies characteristics (also referred to herein as "variables") of droplets 129 placed onto the page, and also includes data for locations where droplets 129 are intended for placement onto the page (e.g., in the event that a droplet is intended for ejection onto the page, but does not actually eject or reach the page). The characteristics may include X droplet position and Y droplet position (e.g., orthogonal coordinate positions) on the page, "color accuracy" (e.g., a quantifiable deviation from an intended color indicated by spectral analysis) or optical density (e.g., a quantifiable deviation from an intended optical density), and may even be reviewable to identify a number of alignment adjustment actions performed for a corresponding printhead or nozzle during an alignment sequence, a number of cleaning actions for a corresponding printhead or nozzle, etc. For example, droplet data for individual nozzles may be analyzed to detect a need for cleaning and alignment adjustment at a printhead 124. Records of previously performed cleanings and alignments may then be made in a system log in memory 114. Thus, historical detection of a need for cleaning and/or alignment adjustment may be found in droplet data, while a history of actual cleanings and/or alignment adjustments may be found in logs in memory 114.

The reference data 115 and measurement data 117 may alternatively comprise information derived from, or initiated in response to evaluation of, droplet data. The reference data 115 and the measurement data 117 may comprise alignment data (e.g., indicating a number of alignment sequences, total actions, or actions per sequence, on a per-printhead basis) and/or cleaning data (e.g., indicating a number of cleaning actions per printhead) originating from printer 120. Controller 112 uses these differences between reference data 115 and measurement data 117 as input to isolation forest 118 in order to draw conclusions regarding print performance for individual nozzles and/or print heads. In such embodiments, alignment data and/or cleaning data may be considered on a per-nozzle basis, or on a per-printhead basis (e.g., as derived from data for individual nozzles).

Print server 110 operates interface (I/F) 116 to communicate with printer 120 and imaging device 150 via network 160. I/F 116 may comprise any suitable network interface, such as a wireless networking interface, ethernet interface, etc. Network 160 may comprise a private wired or wireless network (e.g., a Wireless Area Network (WAN), the Internet, etc.

Printer 120 may comprise a continuous-forms production printer or a cut-sheet printer. Printer 120 includes a printer controller 128, which interprets print data within print jobs in order to generate instructions for ejecting ink onto print media 140. For example, printer controller 128 may process data in a corresponding job ticket (e.g., a Job Definition Format (JDF) job ticket, and may rasterize print data in a Page Description Language (PDL) such as Portable Document Format (PDF) into one or more bitmaps for printing in one or more color planes.

Marking engine 122 includes multiple printheads 124, and each printhead 124 includes multiple nozzles 126 (e.g., tens or hundreds of nozzles) which each controllably eject a droplet 129 of ink onto the print media 140. In many embodiments, each printhead 124 marks a single color, and printheads 124 that mark the same color are grouped into color planes. In this embodiment, printer controller 128 instructs the marking engine 122 to print a test pattern 142 regularly, such as once per day, once per print job, or once per set number of pages. The test pattern 142 includes an arrangement of marks 144 created by droplets 129 from individual ones of the nozzles 126. The test pattern 142 is designed so that the output from each nozzle 126 is capable of being independently distinguished from other nozzles 126 and quantified, when an image of the test pattern 142 is reviewed.

Imaging device 150 acquires images 152 of the test patterns 142 printed by the printer 120, and may comprise an optical scanner, camera, or other device for generating an image 152 of each of the test patterns 142, or portions thereof. In many embodiments, a resolution of the image 152 acquired by the imaging device 150 is set higher than a resolution of the test pattern 142. This ensures that the test pattern 142 does not appear blurry within image 152.

Figure 2:
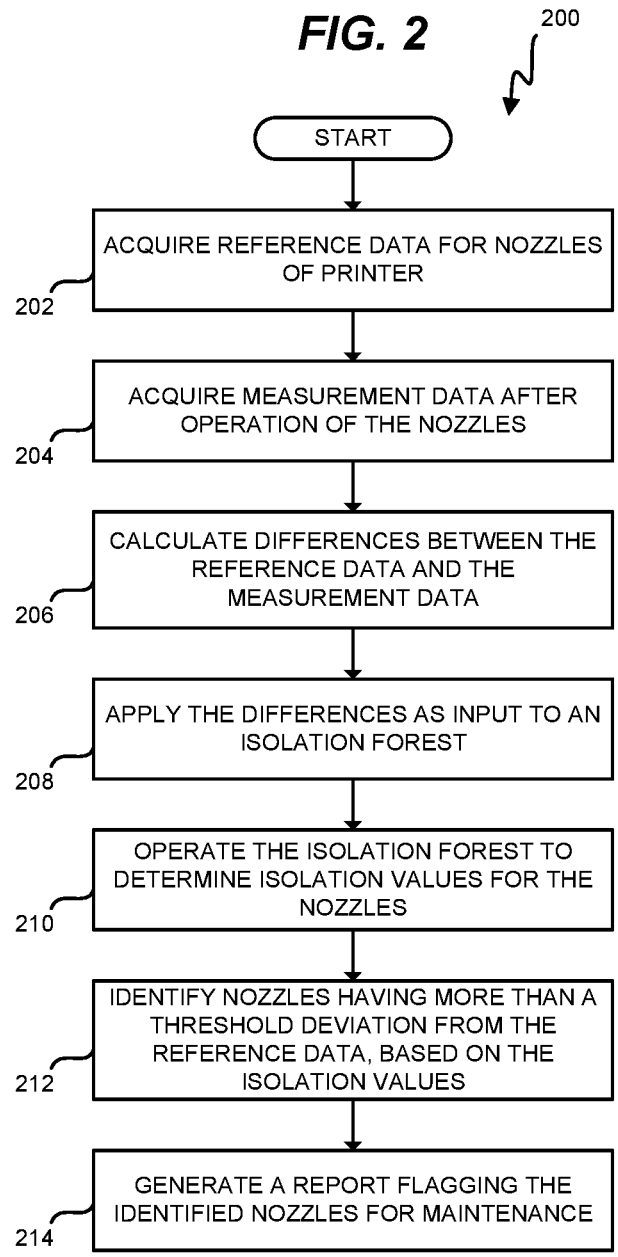
FIG. 2 is a flowchart illustrating a method for identifying print quality in an illustrative embodiment.

The particular arrangement, number, and configuration of components described herein is illustrative and non-limiting. By way of example, in further embodiments, reference data 115 is collected and stored on local hardware (e.g., a processor and memory) at printer 120, and the inverse isolation scoring processes described herein with regard to FIG. 2 are processed on local hardware at printer 120 without network access.

Illustrative details of the operation of print quality detection system 100 will be discussed with regard to FIG. 2. Assume, for this embodiment, that printer 120 has undergone an initial setup process, or is operating in what is considered an ideal or acceptable condition. That is, printer 120 is operating in a state which sets a baseline for print quality and performance FIG. 2 is a flowchart illustrating a method 200 for identifying print quality in an illustrative embodiment. The steps of method 200 are described with reference to print quality detection system 100 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 112 acquires reference data 115 for nozzles 126 of the printer 120. In one embodiment, this comprises controller 112 instructing printer 120 to print one or more test patterns 142, directing imaging device 150 to acquire images 152 of the test patterns 142, analyzing the images 152 to associate droplets 129 with individual ones of nozzles 126 of the printer (e.g., droplet data may be mapped to corresponding nozzles or printheads according to print instructions of the printed test pattern), determining characteristics (e.g., positions, shapes, colors, sizes, uniformity in optical density, etc.) of the droplets 129, and storing the characteristics as reference data 115 in memory 114. As used herein, a "characteristic" relating to droplet data comprises any quantifiable information relating to a specific droplet 129 of marking fluid applied by a nozzle 126. In further embodiments, a characteristic comprises a count of actions relating to alignment and/or cleaning. In such embodiments, characteristics comprise quantifiable information relating to alignment or cleaning processes for the printer 120. In further embodiments, controller 112 consults images 152 of one or more test patterns 142 that were printed by the printer 120 while the printer 120 was determined to be in a "best" or "reference" state for print quality, in order to acquire a set of reference data 115.

The printer 120 continues to operate, for example, by printing incoming print jobs from print server 110. After a predefined amount time (e.g., a predefined period of time such as a day, week, or month), or after a certain amount of production is performed (e.g., a number of linear feet or pages of print media, or a number of print jobs completed), it is desirable to determine whether or not the printer 120 is still printing at the desired level of print quality and performance.

In step 204, controller 112 acquires measurement data 117 after operation of the nozzles 126. In one embodiment, controller 112 directs the printer 120 to print another test pattern 142 for review. Controller 112 further analyzes one or more images 152 of the test pattern 142 in order to determine characteristics of the droplets 129 applied to the test pattern 142, and/or to correlate individual droplets 129 with specific ones of nozzles 126. In a further embodiment, measurement data 117 comprises a count of alignment actions and/or cleaning actions.

In step 206, controller 112 calculates differences between the reference data 115 (which, e.g., define a baseline standard for droplet characteristics, such as droplet characteristics during a prior time period) and the measurement data 117 (which, e.g., defines droplet characteristics, such as current droplet characteristics). In one embodiment, controller 112 performs this operation on a characteristic-by-characteristic basis for each droplet 129. In this manner, each characteristic of each droplet 129 in the measurement data 117 is capable of being quantifiably compared to each corresponding characteristic of each droplet 129 in the reference data 115. The differences, for each characteristic for each droplet 129, may therefore indicate how much each droplet 129 from each nozzle 126 the printer 120 has deviated from its baseline characteristics. In a further embodiment, the differences between the reference data 115 and the measurement data 117 comprise differences in counts of alignment actions and/or cleaning actions.

In step 208, controller 112 applies the differences as input to an isolation forest 118 in memory 114. In one embodiment, controller 112 operates the isolation forest 118 multiple times. Each time the isolation forest 118 is operated, controller 112 applies a new set of differences, for nozzles 126 that together correspond with a next one of printheads 124. That is, the isolation forest 118 may be operated iteratively to score the nozzles 126 for one printhead 124 at a time. This enables controller 112 to quickly identify nozzles 126 within a printhead 124 that have notably deviated with respect to other nozzles 126 in the same printhead 124, which may be particularly beneficial in helping to identify "twisted" printheads 124 having an angular deviation. In another embodiment, controller 112 applies differences for all nozzles 126, across all printheads 124, to the isolation forest 118. In this scenario, the isolation forest 118 is operated to score the nozzles 126 for all printheads 124 at once.

In step 210, the controller 112 operates the isolation forest 118 to determine isolation values for the nozzles 126. The isolation forest 118 may be implemented as a program that takes N dimensions of input, wherein N is the number of characteristics for individual droplets 129 reported by both the reference data 115 and the measurement data 117. The isolation forest 118 generates isolation values that indicate how likely a nozzle 126 is to be an outlier from other nozzles 126 in the group being processed by the isolation forest 118. Thus, when nozzles 126 within a printhead 124 are being processed by the isolation forest 118, those nozzles 126 are checked for deviation with respect to other nozzles 126 in the same printhead 124. When nozzles 126 across the entirety of the printer 120 are being processed by the isolation forest 118, then those nozzles 126 are checked for deviation with respect to all other nozzles 126 in the entire printer.

In one embodiment, the controller 112 operates the isolation forest 118 by iteratively selecting a variable (e.g., a characteristic) provided in the input, assigning a value to the variable, adding a partition at the value for the variable, and subdividing data points of the input into groups separated by partitions. The number of partitions added by the controller 112 before a single point of data (e.g., for a single droplet 129) is "isolated" into a group consisting of only itself is known as an "isolation value." Thus, a low isolation value indicates that a point of data is likely to be an outlier, while a high isolation value indicates that a point of data is not likely to be an outlier.

In step 212, controller 112 identifies nozzles 126 having more than a threshold amount of deviation from the reference data 115 based on the isolation values. For example, the threshold may be defined as an isolation value, below which a corresponding nozzle 126 is considered in need of maintenance. In another example, the threshold may comprise an inverse isolation value, above which a nozzle 126 that ejected the droplet 129 is considered in need of maintenance. In one embodiment, the threshold comprises an inverse isolation value of one quarter, scaled on a range between zero and one.

In one embodiment, the isolation forest 118 is operated to determine isolation values for printheads 124 of the printer 120 based on isolation values for nozzles 126 contained by the printheads 124. For example, an isolation value for a printhead 124 may be set to an average (e.g., mean) of isolation values for its nozzles 126, median of isolation values for its nozzles 126, a lowest isolation value for any of its nozzles 126, etc.

In step 214, controller 112 generates a report flagging the identified nozzles 126 for maintenance. In one embodiment, this comprises identifying printheads 124 having nozzles 126 identified for maintenance, and flagging those printheads 124 for maintenance. In a further embodiment, multiple thresholds exist, and the type of maintenance requested is adjusted based on which threshold is exceeded. For example, deviation greater than that defined by a first threshold may be reported as a need for cleaning and/or adjustment for a printhead 124, while deviation greater than that defined by a second threshold may be reported as a need for replacement of the printhead 124.

In a further embodiment, the controller 112 determines inverse isolation values for the nozzles 126 based on the isolation values. For example, controller 112 may re-scale the set of isolation values to a new range (e.g., a range between zero and one, or between zero and one hundred), and then invert the isolation values to create inverse isolation values. An inverse isolation value may be beneficial for print operators seeking to quantify print quality, as a larger inverse isolation value corresponds with a greater amount of deviation. Thus, controller 112 may even include an aggregation of inverse isolation values in the report as a print quality metric.

Method 200 provides a technical benefit over prior methods for inspecting nozzles, because it rapidly identifies nozzles that are performing notably more poorly than their peers on the same printer 120 or printhead 124. This in turn enables a print shop operator to rapidly identify and address nozzles 126 that are creating errors which are most likely to be noticeable, or that are subject to a great deal of cleaning and/or alignment. Furthermore, the use of an isolation forest 118 provides a technical benefit by emphasizing the presence of nozzles 126 having outlier amounts of deviation. Other statistical techniques, such as mean or median values, would mask the presence of such nozzles 126.

Figure 3:
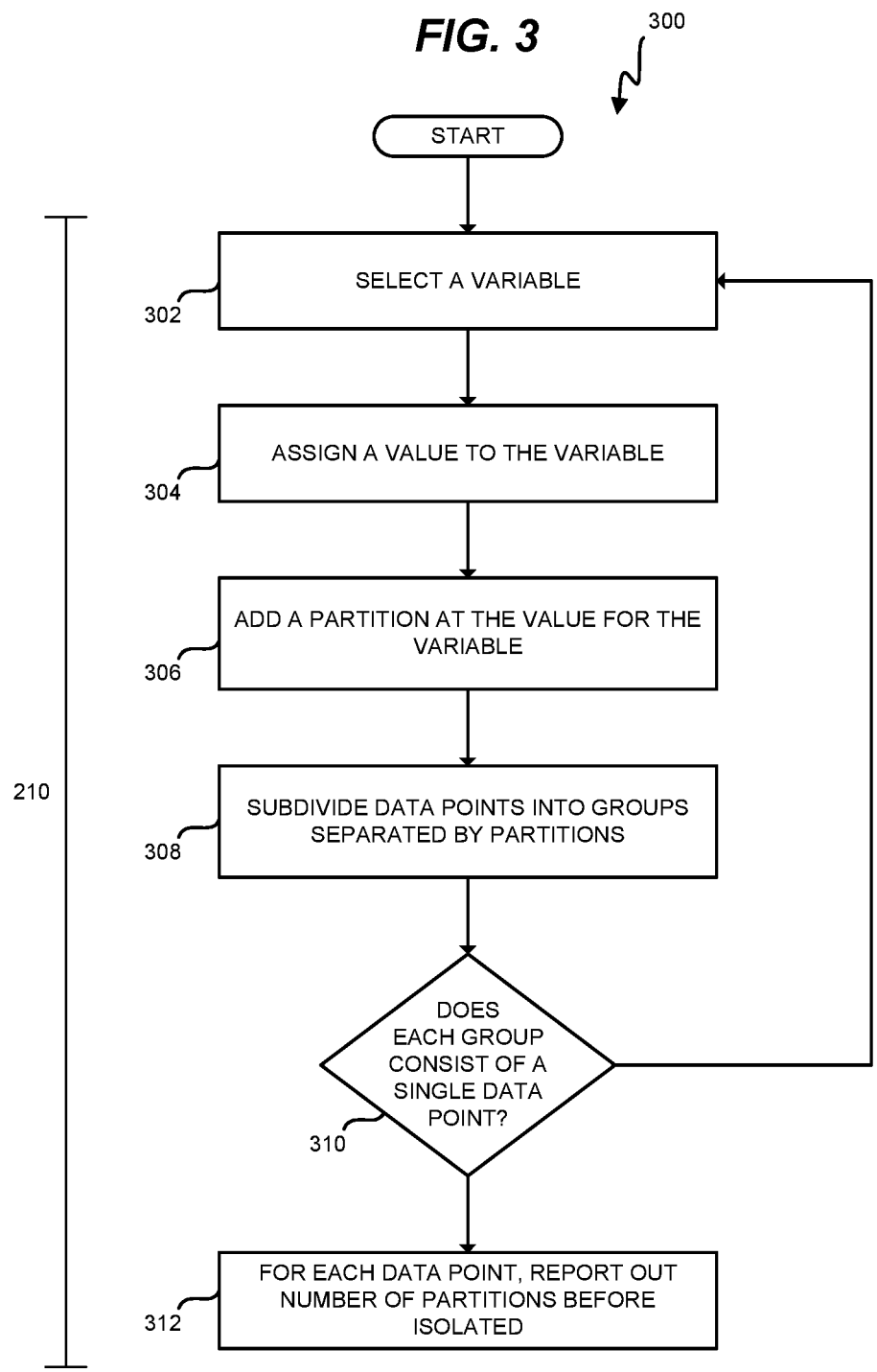
FIG. 3 is a flowchart illustrating additional details of operating an isolation forest to identify print quality in an illustrative embodiment.

FIG. 3 is a flowchart illustrating additional details of operating an isolation forest to identify print quality in an illustrative embodiment. Method 300 of FIG. 3 may be implemented, for example, in order to accomplish step 210 of method 200 of FIG. 2.

Step 302 includes controller 112 selecting a variable. The variable selected is a dimension of input that varies between data points, and is indicative of print quality. For example, X deviation and Y deviation are variables, but a name or identifier for a nozzle 126 is not. In this case, a variable comprises any characteristic for which differences have been provided as input to the isolation forest 118. This may be performed by controller 112 entirely randomly, as part of a weighted random process, etc. The number of variables that can be selected from is equal to the number of variables used as input to the isolation forest 118.

Step 304 includes controller 112 assigning a value to the variable. This comprises choosing a value between the minimum and maximum value found for the variable in the input. For example, if data points used as input to the isolation forest range between values of two and five for the variable, then a value will be assigned between two and five.

Step 306 includes controller 112 adding a partition at the value for the variable. A partition has the potential to isolate data points in the input from each other. For example, a partition having a value of two for a variable may be used as an indicator to separate data points having a value of less than two from data points having a value of more than two for that variable.

Step 308 includes controller 112 subdividing the data points into groups separated by the partition. Controller 112 may subdivide data points into groups by determining whether each data point is above or below the value of the partition. This subdividing process takes into account all existing partitions. That is, controller 112 may subdivide groups that have already been created or separated by other partitions. As a part of this process, if a data point is subdivided into a group that consists only of itself, the controller 112 associates the current number of partitions with the data point. This number of partitions is the isolation value for the data point. This isolation value is then locked in place for the data point, and is not further altered for that data point as new partitions are added.

In step 310, controller 112 determines whether each of the groups created by all of the partitions consist of a single data point. That is, if partitions have "fenced off" each data point in the input into a group of one, then the isolation forest 118 is ready to complete operation. Thus, in step 312, controller 112 reports out a number of partitions for each data point that were used to fully isolate the data point into a group of one. If not all of the groups consist of a single data point, then processing returns to steps 302-308, wherein another partition is added.

Utilizing an isolation forest 118 to identify outlier nozzles provides a substantial technical benefit, because isolation values for outliers are markedly different from isolation values for "typical" nozzles 126. This enables a print shop operator to rapidly identify nozzles 126 that are not operating in an expected or normal manner. Hence, print shop operators are capable of responding swiftly in order to address such abnormalities (e.g., by cleaning or replacing a printhead 124, etc.).

Stated in other words, isolation forest 118 advantageously does not compress or hide nozzles 126 that produce droplets 129 with outlier characteristics, but rather increase an amount of consideration provided to unusual data points relating to printheads 124 and nozzles 126. This means that it becomes easier to detect low frequency, high degree abnormalities created by nozzles 126.

Figures 4, 5:
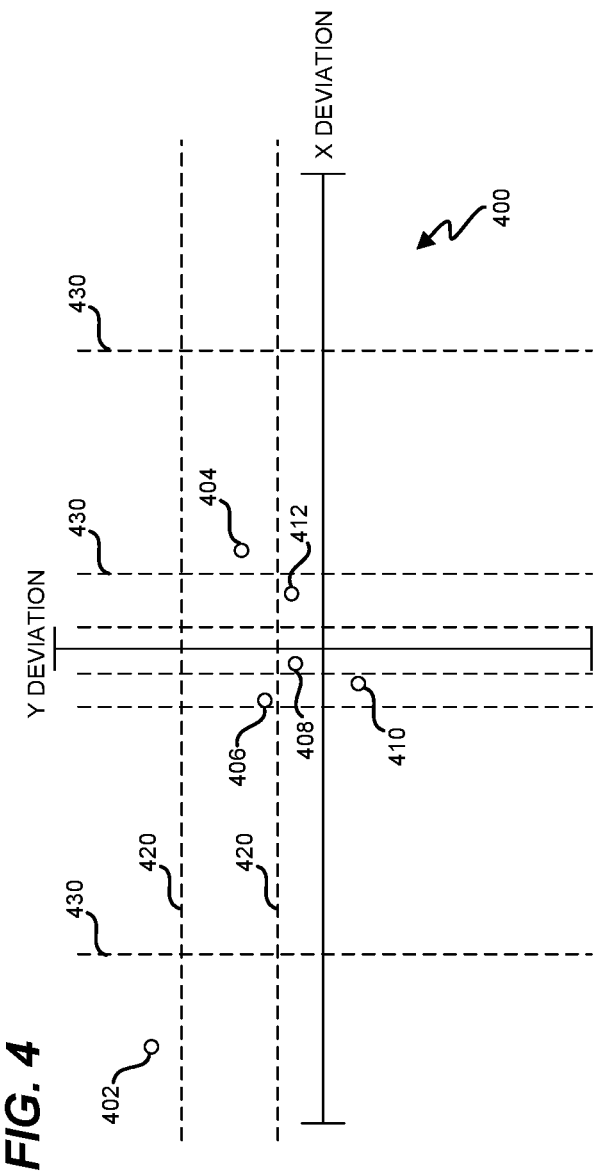
FIG. 4 is a diagram depicting operation of an isolation forest on a small dataset in an illustrative embodiment.
FIG. 5 is a table depicting isolation values for data points in an illustrative embodiment.

FIG. 4 is a diagram 400 depicting operation of an isolation forest 118 on a small dataset in an illustrative embodiment. In this embodiment, the dataset includes data points 402, 404, 406, 408, 410, and 412. Furthermore, in this embodiment, the dataset includes only two characteristics/variables: one for X deviation of a droplet 129 from a baseline, and one for Y deviation of a droplet 129 from a baseline. During operation of the isolation forest 118, the controller 112 randomly determines whether to add a partition 420 for Y deviation, or a partition 430 for X deviation. The partition is placed at a random location between the highest and lowest amount of deviation within the dataset for the characteristic/variable. For example, if X deviation ranged between one and ten, then a partition 430 for X deviation may be placed at a random location between one and ten. Similarly, if Y deviation ranged between ten and fifty, then a partition 420 for Y deviation may be placed at a random location between ten and fifty.

After adding a new partition, controller 112 checks the dataset to determine if any data points have been "isolated" or otherwise separated from all other data points by partitions. If a data point has been separated from all other data points by partitions, then the controller 112 assigns the data point an isolation value equal to the number of partitions currently existing. The controller 112 then repeats adding partitions and checking for isolation until all data points have been isolated, or until a set number of partitions have been added.

In further embodiments, a larger or smaller number of characteristics/variables may be used as input to the isolation forest 118. For example, characteristics that are highly indicative of changes in print quality may be used as input to the isolation forest 118.

FIG. 5 is a table 500 depicting isolation values for data points in an illustrative embodiment. In this embodiment, the table 500 reports an isolation value for each data point. The isolation value is the number of randomly added partitions that had been added at the time that a corresponding data point was isolated. Data points that are outliers are separated from other data points by larger swaths of empty space, and therefore are isolated more quickly than data points which are clustered together. Hence, outlier data points have lower isolation values than data points clustered within the expected range of values for the dataset being considered.

Figure 6:
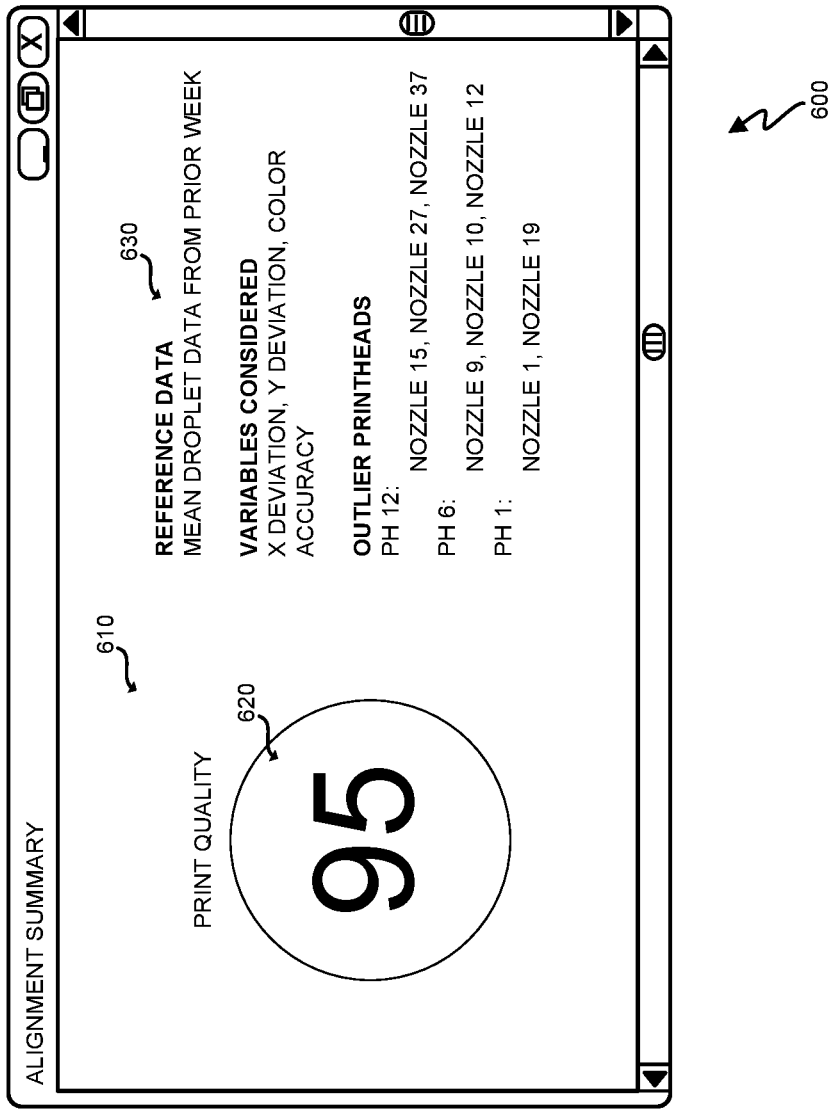
FIG. 6 is a Graphical User Interface (GUI) that reports print quality for a printer in an illustrative embodiment.

FIG. 6 is a Graphical User Interface (GUI) 600 that reports print quality for a printer 120 in an illustrative embodiment. In this embodiment, controller 112 generates a GUI 600 after each alignment for a printer 120. The report 610 of the GUI 600 includes an overall print quality metric 620, which is reported as an inverse isolation value, ranged between zero and one hundred, and averaged across all printheads. The report 610 also includes a portion 630 which reports the nature of the reference data 115 used (e.g., whether the reference data 115 was from a prior calibration of the printer 120, was determined from normal operations of the printer 120, etc.), characteristics of the droplets 129 used as input to the isolation forest 118, and a list of printheads 124 (and/or nozzles 126) detected having more than a threshold amount of deviation from the reference data 115, as determined by the isolation forest 118.

Figure 7:
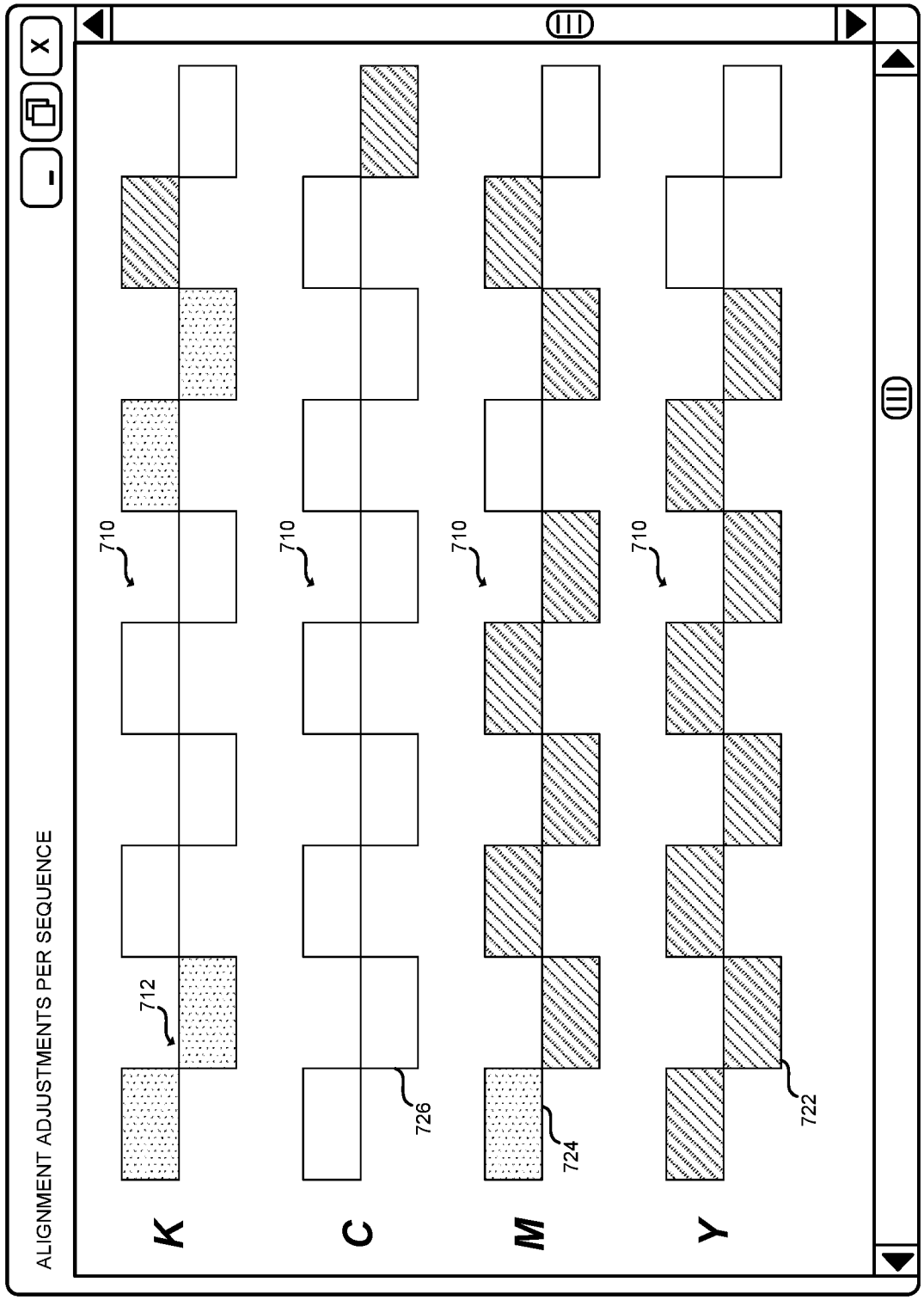
FIG. 7 is a GUI that depicts a number of alignment adjustment actions for printheads per alignment sequence.

FIG. 7 is a GUI 700 that depicts a number of alignment adjustment actions for printheads 124 per adjustment sequence. However, in further embodiments, a total number of alignment adjustment actions, or a total number of alignment adjustment sequences, are reported via GUI 700 to provide different insights into printhead performance. The number of alignment adjustment actions is organized by color plane 710, and includes a block 712 for each printhead 124. However, the count of alignment adjustments per adjustment sequence is normalized to the mean of other printheads 124 in the color plane 710. Each block 712 is shaded based on whether the corresponding printhead 124 received a lesser, average, or greater number of alignment adjustment actions than other printheads 124 in the same color plane 710. Specifically, blocks 726 represent printheads 124 having received a less than average number of alignment adjustment actions, blocks 724 represent printheads 124 having received an average number of alignment adjustment actions, and blocks 722 represent printheads 124 having received a greater than average number of alignment adjustment actions. In further embodiments, controller 112 applies the number of adjustment actions per printhead 124 as input to the isolation forest 118, and shades the blocks 712 for corresponding printheads 124 based on inverse isolation values for those printheads 124. In this manner, GUI 700 may provide data that complements data provided via the operation of method 200 of FIG. 2.

Figure 8:
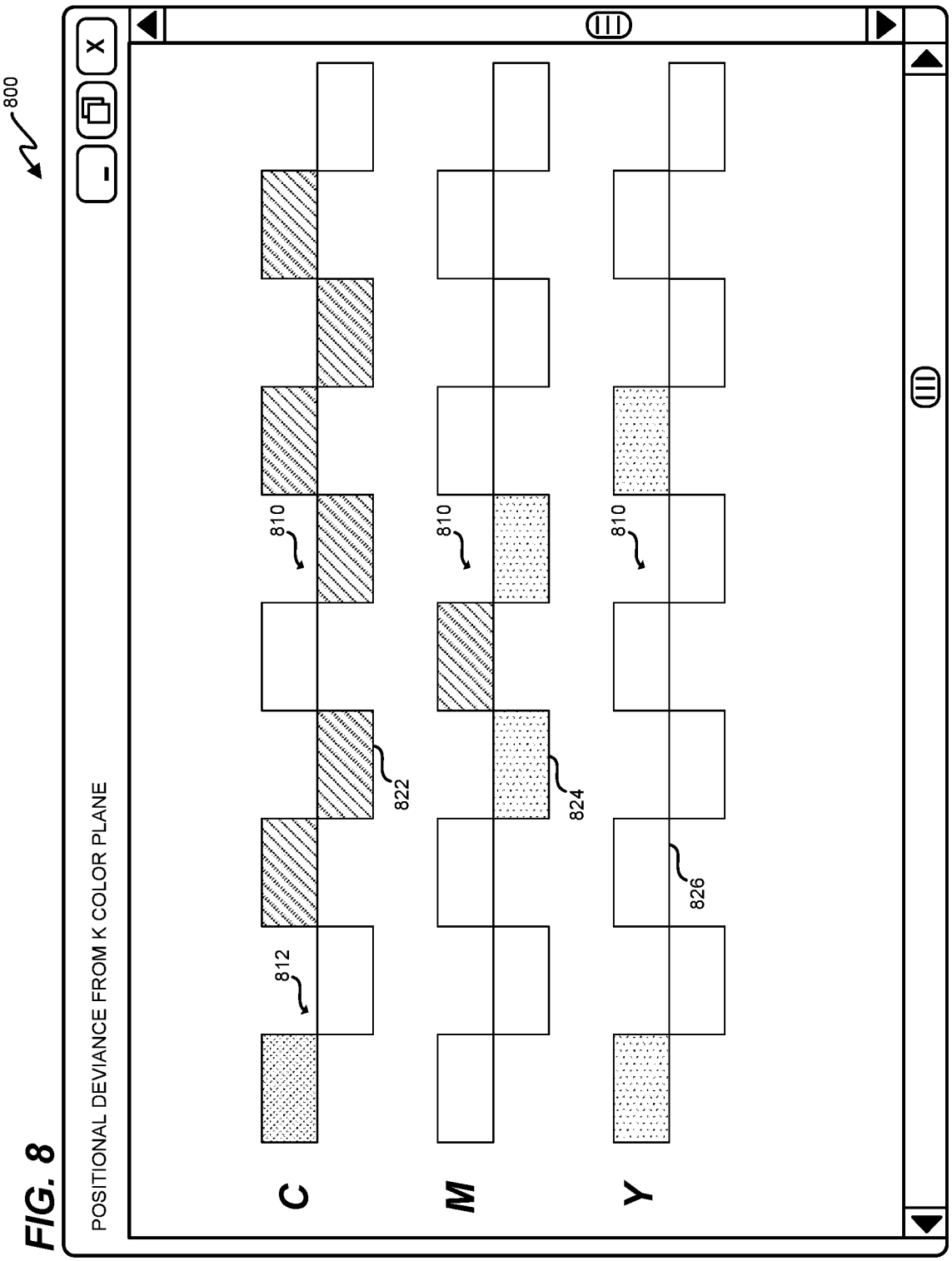
FIG. 8 is a GUI that depicts positional deviance from a K color plane.

FIG. 8 is a GUI 800 that depicts positional deviance from a K color plane. The amount of positional deviance is organized by color plane 810, and includes a block 812 for each printhead 124. Each block 812 is shaded based on whether the corresponding printhead 124 had a lesser, average, or greater amount of positional deviance than other printheads 124 in the same color plane 710. Specifically, blocks 826 represent printheads 124 having a less than average amount of positional deviance, blocks 824 represent printheads 124 having an average amount of positional deviance, and blocks 822 represent printheads 124 having a greater than average amount of positional deviance. In further embodiments, controller 112 applies the aggregate amount of positional deviance across all nozzles 126 per printhead 124 as input to the isolation forest 118, and shades the blocks 812 for corresponding printheads 124 based on inverse isolation values for those printheads 124. Determining color plane positional deviance from the K color plane yields the technical benefit of determining color plane to color plane registration which may otherwise produce visible print artifacts.

EXAMPLES

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

A first clause is provided in the form of a system for identifying print quality at a printer. The system includes a memory that stores reference data for nozzles of a printer, and a controller. The controller is configured to acquire measurement data after operation of the nozzles, calculate differences between the reference data and the measurement data, apply the differences as an input to an isolation forest, operate the isolation forest to determine isolation values for the nozzles, identify nozzles having more than a threshold amount of deviation from the reference data based on the isolation values, and generate a report flagging the identified nozzles for maintenance.

A second clause is provided in the form of the system of the first clause, wherein the controller is further configured to operate the isolation forest by iteratively selecting a variable provided in the input, assigning a value to the variable, adding a partition at the value for the variable, and subdividing data points of the input into groups separated by partitions.

A third clause is provided in the form of the system of the first clause, wherein the controller is further configured to determine inverse isolation values for the nozzles based on the isolation values, and to include an aggregation of the inverse isolation values in the report as print quality metric.

A fourth clause is provided in the form of the system of the first clause, wherein the isolation forest determines isolation values for printheads of the printer based on the isolation values for nozzles contained by the printheads.

A fifth clause is provided in the form of the system of the first clause, wherein the reference data and the measurement data measure a same set of variables, and the variables include X droplet position and Y droplet position.

A sixth clause is provided in the form of the system of the first clause, wherein the reference data and the measurement data measure a same set of variables, and the variables include color accuracy.

A seventh clause is provided in the form of the system of the first clause, wherein the reference data and the measurement data measure a same set of variables, and the variables include a number of alignment adjustment actions performed during an alignment sequence.

An eighth clause is provided in the form of a non-transitory computer readable medium embodying programmed instructions which, when executed by a processor, are operable for performing a method of identifying print quality at a printer. The method includes storing reference data for nozzles of a printer, acquiring measurement data after operation of the nozzles, calculating differences between the reference data and the measurement data, applying the differences as an input to an isolation forest, operating the isolation forest to determine isolation values for the nozzles, identifying nozzles having more than a threshold amount of deviation from the reference data based on the isolation values, and generating a report flagging the identified nozzles for maintenance.

A ninth clause is provided in the form of the medium of the eighth clause, wherein operating the isolation forest comprises iteratively: selecting a variable provided in the input, assigning a value to the variable, adding a partition at the value for the variable; and subdividing data points of the input into groups separated by partitions.

A tenth clause is provided in the form of the medium of the eighth clause, wherein the method further includes: determining inverse isolation values for the nozzles based on the isolation values; and including an aggregation of the inverse isolation values in the report as a print quality metric.

An eleventh clause is provided in the form of the medium of the eighth clause, wherein operating the isolation forest to determine the isolation values for the nozzles comprises determining isolation values for printheads of the printer that contain the nozzles.

A twelfth clause is provided in the form of the medium of the eighth clause, wherein the reference data and the measurement data measure a same set of variables, and the variables include X droplet position and Y droplet position.

A thirteenth clause is provided in the form of the medium of the eighth clause, wherein the reference data and the measurement data measure a same set of variables, and the variables include color accuracy.

A fourteenth clause is provided in the form of the medium of the eighth clause, wherein the reference data and the measurement data measure a same set of variables, and the variables include a number of alignment adjustment actions performed during an alignment sequence.

A fifteenth clause is provided in the form of a method for identifying print quality at a printer. The method includes storing reference data for nozzles of a printer, acquiring measurement data after operation of the nozzles, calculating differences between the reference data and the measurement data, applying the differences as an input to an isolation forest, operating the isolation forest to determine isolation values for the nozzles, identifying nozzles having more than a threshold amount of deviation from the reference data based on the isolation values, and generating a report flagging the identified nozzles for maintenance.

A sixteenth clause is provided in the form of the method of the fifteenth clause, wherein operating the isolation forest comprises iteratively: selecting a variable provided in the input; assigning a value to the variable; adding a partition at the value for the variable; and subdividing data points of the input into groups separated by partitions.

A seventeenth clause is provided in the form of the method of the fifteenth clause, wherein the method further includes determining inverse isolation values for the nozzles based on the isolation values, and including an aggregation of the inverse isolation values in the report as a print quality metric.

An eighteenth clause is provided in the form of the method of the fifteenth clause, wherein operating the isolation forest to determine the isolation values for the nozzles comprises determining isolation values for printheads of the printer that contain the nozzles.

A nineteenth clause is provided in the form of the method of the fifteenth clause, wherein the reference data and the measurement data measure a same set of variables, and the variables include X droplet position and Y droplet position.

A twentieth clause is provided in the form of the method of the fifteenth clause, wherein: the reference data and the measurement data measure a same set of variables, and the variables include color accuracy.

Figure 9:
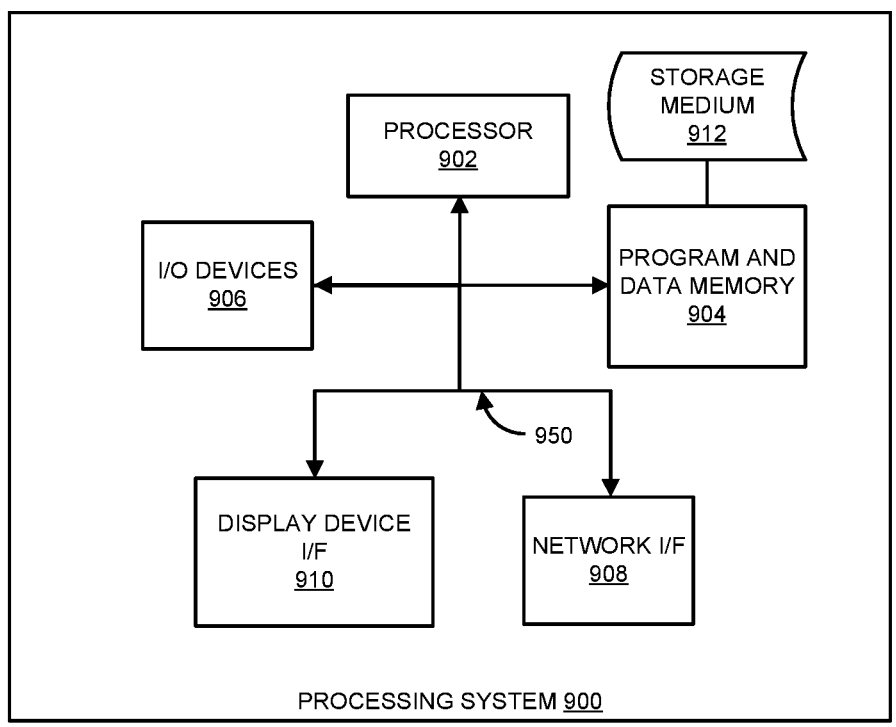
FIG. 9 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print quality detection system 100 to perform the various operations disclosed herein. FIG. 9 illustrates a processing system 900 operable to execute a computer readable medium embodying programmed instructions to perform desired functions in an illustrative embodiment. Processing system 900 is operable to perform the above operations by executing programmed instructions tangibly embodied on computer readable storage medium 912. In this regard, embodiments of the invention can take the form of a computer program accessible via computer-readable medium 912 providing program code for use by a computer or any other instruction execution system. For the purposes of this description, computer readable storage medium 912 can be anything that can contain or store the program for use by the computer.

Computer readable storage medium 912 can be an electronic, magnetic, optical, electromagnetic, infrared, or semiconductor device. Examples of computer readable storage medium 912 include a solid state memory, a magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

Processing system 900, being suitable for storing and/or executing the program code, includes at least one processor 902 coupled to program and data memory 904 through a system bus 950. Program and data memory 904 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 906 (including but not limited to keyboards, displays, pointing devices, etc.) can be coupled either directly or through intervening I/O controllers. Network adapter interfaces 908 may also be integrated with the system to enable processing system 900 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 910 may be integrated with the system to interface to one or more display devices, such as printing systems and screens for presentation of data generated by processor 902.

Although specific embodiments were described herein, the scope of the invention is not limited to those specific embodiments. The scope of the invention is defined by the following claims and any equivalents thereof.

What is claimed is:

1. A system for identifying print quality at a printer, the system comprising:
    a memory that stores reference data for a plurality of nozzles of a printer; and
    a controller configured to acquire measurement data for each nozzle of the plurality of nozzles after operation of the plurality of nozzles, calculate differences for each nozzle between the reference data and the measurement data, apply the differences as an input to an isolation forest, operate the isolation forest to determine isolation values for each nozzle, identify one or more individual nozzles of the plurality of nozzles having more than a threshold amount of deviation from the reference data based on the isolation values, and generate a report flagging the identified one or more individual nozzles for maintenance.

2. The system of claim 1 wherein:
    the controller is further configured to operate the isolation forest by iteratively selecting a variable provided in the input, assigning a value to the variable, adding a partition at the value for the variable, and subdividing data points of the input into groups separated by partitions.

3. The system of claim 1 wherein:
    the controller is further configured to determine inverse isolation values for the plurality of nozzles based on the isolation values, and to include an aggregation of the inverse isolation values in the report as a print quality metric.

4. The system of claim 1 wherein:
    the isolation forest determines isolation values for printheads of the printer based on the isolation values for each nozzle contained by the printheads.

5. The system of claim 1 wherein:
    the reference data and the measurement data measure a same set of variables, and the variables include X droplet position and Y droplet position.

6. The system of claim 1 wherein:
    the reference data and the measurement data measure a same set of variables, and the variables include color accuracy.

7. The system of claim 1 wherein:
    the reference data and the measurement data measure a same set of variables, and the variables include a number of alignment adjustment actions performed during an alignment sequence.

8. A non-transitory computer readable medium embodying programmed instructions which, when executed by a processor, are operable for performing a method of identifying print quality at a printer, the method comprising:
    storing reference data for a plurality of nozzles of a printer;
    acquiring measurement data for each nozzle of the plurality of nozzles after operation of the plurality of nozzles;
    calculating differences for each nozzle between the reference data and the measurement data;
    applying the differences as an input to an isolation forest;
    operating the isolation forest to determine isolation values for each nozzle;
    identifying one or more individual nozzles of the plurality of nozzles having more than a threshold amount of deviation from the reference data based on the isolation values; and
    generating a report flagging the identified one or more individual nozzles for maintenance.

9. The non-transitory computer readable medium of claim 8, wherein:
    operating the isolation forest comprises iteratively:
        selecting a variable provided in the input;
        assigning a value to the variable;
        adding a partition at the value for the variable; and
        subdividing data points of the input into groups separated by partitions.

10. The non-transitory computer readable medium of claim 8, wherein the method further comprises:
    determining inverse isolation values for each nozzle of the plurality of nozzles based on the isolation values; and
    including an aggregation of the inverse isolation values in the report as a print quality metric.

11. The non-transitory computer readable medium of claim 8, wherein:
    operating the isolation forest to determine the isolation values for the plurality of nozzles comprises determining isolation values for printheads of the printer that contain the plurality of nozzles.

12. The non-transitory computer readable medium of claim 8, wherein:
    the reference data and the measurement data measure a same set of variables, and the variables include X droplet position and Y droplet position.

13. The non-transitory computer readable medium of claim 8, wherein:
    the reference data and the measurement data measure a same set of variables, and the variables include color accuracy.

14. The non-transitory computer readable medium of claim 8, wherein:
    the reference data and the measurement data measure a same set of variables, and the variables include a number of alignment adjustment actions performed during an alignment sequence.

15. A method for identifying print quality at a printer, the method comprising:
    storing reference data for a plurality of nozzles of a printer;
    acquiring measurement data for each nozzle of the plurality of nozzles after operation of the plurality of nozzles;
    calculating differences for each nozzle between the reference data and the measurement data;
    applying the differences as an input to an isolation forest;
    operating the isolation forest to determine isolation values for each nozzle;

identifying one or more individual nozzles of the plurality of nozzles having more than a threshold amount of deviation from the reference data based on the isolation values; and generating a report flagging the identified one or more individual nozzles for maintenance.

16. The method of claim 15, wherein:

operating the isolation forest comprises iteratively:
 selecting a variable provided in the input;
 assigning a value to the variable;
 adding a partition at the value for the variable; and
 subdividing data points of the input into groups separated by partitions.

17. The method of claim 15, further comprising:

determining inverse isolation values for each nozzle of the plurality of nozzles based on the isolation values; and including an aggregation of the inverse isolation values in the report as a print quality metric.

18. The method of claim 15, wherein:

operating the isolation forest to determine the isolation values for the plurality of nozzles comprises determining isolation values for printheads of the printer that contain the plurality of nozzles.

19. The method of claim 15, wherein:

the reference data and the measurement data measure a same set of variables, and the variables include X droplet position and Y droplet position.

20. The method of claim 15, wherein:

the reference data and the measurement data measure a same set of variables, and the variables include color accuracy.

* * * * *